(12) United States Patent
Lee

(10) Patent No.: US 9,378,599 B2
(45) Date of Patent: Jun. 28, 2016

(54) ACCESS MANAGEMENT SYSTEM AND METHOD

(71) Applicant: SAMSUNG SDS CO., LTD., Seoul (KR)

(72) Inventor: Young-Hee Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 58 days.

(21) Appl. No.: 14/527,899

(22) Filed: Oct. 30, 2014

(65) Prior Publication Data

US 2015/0325067 A1 Nov. 12, 2015

(30) Foreign Application Priority Data

May 12, 2014 (KR) .................. 10-2014-0056741

(51) Int. Cl.
*G07C 9/00* (2006.01)
*G06F 21/31* (2013.01)

(52) U.S. Cl.
CPC ........ *G07C 9/00071* (2013.01); *G07C 9/00007* (2013.01); *G07C 9/00079* (2013.01); *G07C 9/00087* (2013.01); *G07C 9/00119* (2013.01); *G07C 9/00126* (2013.01); *G06F 21/31* (2013.01)

(58) Field of Classification Search
CPC ......... G06F 21/79; G06F 21/32; G06F 21/31; G06F 21/40; G06F 21/33; G06F 21/41; G06F 21/10; G06F 21/00; G06F 21/30; G06F 21/35; H04L 63/126; H04L 63/08; G07C 9/00039; G07C 9/00087; G07C 9/00119; G07C 9/00071; G07C 9/00126; G07C 9/00007; G07C 9/00079

USPC ........ 340/5.26; 726/18, 7, 2, 16, 20; 713/185, 713/175

See application file for complete search history.

(56) References Cited

U.S. PATENT DOCUMENTS

| 6,275,941 B1* | 8/2001 | Saito ............. G06F 21/33 713/175 |
| 8,074,271 B2* | 12/2011 | Davis ............. G06F 21/31 713/185 |
| 8,407,477 B2* | 3/2013 | Ogawa ............. G06F 21/10 713/176 |

(Continued)

FOREIGN PATENT DOCUMENTS

| KR | 10-2002-0011666 A | 2/2002 |
| KR | 10-2007-0055707 A | 5/2007 |
| KR | 10-0786266 B1 | 12/2007 |

(Continued)

OTHER PUBLICATIONS

Communication dated Jan. 27, 2015, issued by the International Searching Authority in counterpart International Application No. PCT/KR2014/008061.

*Primary Examiner* — Ali Neyzari
(74) *Attorney, Agent, or Firm* — Sughrue Mion, PLLC

(57) ABSTRACT

An access management system and method are provided. The access management system includes an authentication means having an authentication key indicating an identity of a visitor, an authentication terminal configured to register by receiving user information corresponding to the authentication key, and store the user information matched with the authentication key recognized when the visitor accesses as an access history information of the visitor, and a user terminal configured to provide the user information corresponding to the authentication key to the authentication terminal.

21 Claims, 13 Drawing Sheets

(56) References Cited

U.S. PATENT DOCUMENTS

| | | | | |
|---|---|---|---|---|
| 8,578,472 B2 * | 11/2013 | Davis | G06F 21/31 | 713/185 |
| 8,590,018 B2 * | 11/2013 | Thavasi | G06F 21/31 | 726/2 |
| 8,832,798 B2 * | 9/2014 | Thavasi | G06F 21/31 | 726/4 |
| 8,887,268 B2 * | 11/2014 | Uchida | G06F 21/79 | 713/182 |
| 2012/0036575 A1 | 2/2012 | Davis et al. | | |

FOREIGN PATENT DOCUMENTS

| | | |
|---|---|---|
| KR | 10-2010-0056688 A | 5/2010 |
| KR | 10-2010-0136355 A | 12/2010 |
| KR | 10-1296863 B1 | 8/2013 |

* cited by examiner

FIG. 3

STORAGE TABLE — 123a

| AUTHENTICATION KEY | USER INFORMATION |
|---|---|
| xxxxxxxx | HONG GIL DONG |
| xxxxxxxx | SOMEBODY |

FIG. 4

HISTORY TABLE — 123b

| AUTHENTICAITON MEANS | USER INFORMATION | ACCESS TIME |
|---|---|---|
| 1(CARD) | HONG GIL DONG | 14/04/01 09:00 |
| 2(FINGERPRINT) | SOMEBODY | 14/04/01 09:20 |

FIG. 8

| ACCESS HISTORY | | |
|---|---|---|
| DATE AND TIME | USER | KEY TYPE |
| 04/05 16:13 | HONG GIL DONG | 📱 |
| 04/05 16:13 | SOMEBODY | 💳 |
| 04/05 16:12 | SOMEBODY | 💳 |
| 04/05 16:11 | HONG GIL DONG | 💳 |
| 04/05 16:10 | HONG GIL DONG | 📱 |
| 04/05 16:06 | HONG GIL DONG | 📱 |

HOME | | AUTHENTICATION KEY MANAGEMENT | SETTING

ACCESS MANAGEMENT SYSTEM AND METHOD

CROSS-REFERENCE TO RELATED APPLICATION

This application claims priority under 35 U.S.C. §119 to Korean Patent Application No. 10-2014-0056741 filed on May 12, 2014, the entire contents of which are incorporated herein by reference in their entirety.

BACKGROUND

1. Field

Embodiments of the inventive concept relate to an access management system and method, and particularly, to an access management system and method capable of intuitively confirming an access history of a visitor using identifiable user information without a separate server.

2. Description of Related Art

Recently, as a life becomes more abundant and comfortable, an interest in security is being increased. In a conventional door locking device, there is inconvenience in which a user always carries a key when he or she goes out, and anxiety due to ease of copying the key and loss of the key has been always present. In order to solve both the inconvenience and the anxiety, a digital door locking device has been developed and used.

A digital door lock system is being used by introducing an electronic card using electrical characteristics or a password, and the door lock system using the electronic card controls a door to open or close after confirming information registered in the electronic card by reading the electronic card by a card reader included in the door lock system. Meanwhile, the door lock using the password controls a door to open or close by confirming whether a password input by a user is a previously registered password when the user directly inputs the password.

A conventional access management system is disclosed in Korean Patent Publication No. 10-2002-0011666. The conventional access management system transmits a specific identification (ID) of a corresponding authentication key to a separate server whenever an authentication key of a visitor is authenticated, and stores by matching the specific ID with an identifiable name.

Since the conventional access management system requires an apparatus having a separate database (DB) such as a server, there is a burden of cost. Further, since the conventional access management system has to make a request to the server and receive an access history from the server in order to read an access history of a visitor, there is an inconvenient problem.

SUMMARY

Embodiments of the inventive concept provide an access management system and method capable of reducing a cost since a separate server is not required.

Further, embodiments of the inventive concept provide an access management system and method capable of confirming an access history of a visitor using highly identifiable information regardless of a type of authentication means.

The technical objectives of the inventive concept are not limited to the above disclosure; other objectives may become apparent to those of ordinary skill in the art based on the following descriptions.

In accordance with one aspect of the inventive concept, an access management system, includes: an authentication means having an authentication key indicating an identity of a visitor; an authentication terminal configured to register by receiving user information corresponding to the authentication key, and store the user information matched with the authentication key recognized when the visitor accesses as an access history information of the visitor; and a user terminal configured to provide the user information corresponding to the authentication key to the authentication terminal.

The authentication terminal may include: a first communication unit configured to perform local area wireless communication with the user terminal; an authentication key recognition unit configured to recognize the authentication key; a storage unit configured to store the authentication key, the user information corresponding to the authentication key, and access history information of the visitor; and a first control unit configured to recognize a registration target authentication key using the authentication key recognition unit when an authentication key registration request signal is received from the user terminal through the first communication unit, request the user information corresponding to the recognized registration target authentication key to the user terminal, register in the storage unit by matching the user information provided from the user terminal with the registration target authentication key, and store the user information corresponding to the authentication key provided by the visitor as the access history information of the visitor when the visitor enters and exits.

The first control unit may determine whether the authentication key recognized when the visitor enters and exits is registered in the storage unit, and when the recognized authentication key is registered in the storage unit, release a locking device of a door, and store the user information corresponding to the recognized authentication key as the access history information of the visitor in the storage unit.

The first control unit may transmit the access history information of the visitor stored in the storage unit to the user terminal through the first communication unit when a signal requesting visitors' access history information is received from the user terminal.

The user terminal may include: a second communication unit configured to perform local area wireless communication with the authentication terminal; an authentication key management unit configured to request an authentication key registration to a door lock terminal, and provide the user information corresponding to the authentication key; an access history confirmation unit configured to confirm the access history information of the visitor; and a second control unit configured to request the authentication key registration to the door lock terminal using the authentication key management unit, provide the user information corresponding to the authentication key to the door lock terminal when a signal of requesting the user information corresponding to the authentication key is received from the door lock terminal through the second communication unit, and display by receiving the access history information of the visitor from the door lock terminal.

The second control unit may delete the authentication key which is previously registered in the authentication terminal through the authentication key management unit.

The second control unit may change the user information corresponding to the authentication key which is previously registered in the authentication terminal through the authentication key management unit.

The user information corresponding to the authentication key may include at least one among a name, a nickname, a telephone number, and an address.

The access history information of the visitor may further include an access time, and a type of authentication means.

The authentication means may include at least one among a card, a communication terminal, and biometric authentication.

In accordance with another aspect of the inventive concept, an access management method, includes: registering an authentication key indicating an identity of a visitor in an authentication terminal; receiving and registering user information corresponding to the authentication key from a user terminal; storing the user information corresponding to the authentication key recognized when the visitor enters and exits as an access history information; and confirming the access history information.

The registering of the authentication key may include: receiving an authentication key registration request signal from the user terminal; recognizing the authentication key; determining whether the recognized authentication key is a new authentication key; and registering the recognized authentication key when the recognized authentication key is the new authentication key, and transmitting a message indicating that the recognized authentication key is a previously registered authentication key to the user terminal when he recognized authentication key is the previously registered authentication key.

Before the receiving of the authentication key registration request signal from the user terminal, the access management method may further include performing a communication connection between the authentication terminal and the user terminal.

The receiving and registering of the user information corresponding to the authentication key may include: requesting the user information corresponding to the authentication key to the user terminal; determining whether the user information corresponding to the authentication key is received from the user terminal; and registering by matching the user information with a corresponding authentication key when the user information corresponding to the authentication key is received.

After the registering by matching the user information with the corresponding authentication key, the access management method may further include ending the communication connection between the authentication terminal and the user terminal.

The storing of the user information corresponding to the authentication key recognized when the visitor enters and exits as the access history information, may include: determining whether the authentication key recognized when the visitor enters and exits is a previously registered authentication key; and releasing a locking device of a door when the authentication key recognized when the visitor enters and exits is the previously registered authentication key, and storing the user information corresponding to the authentication key as the access history information.

After the determining of whether the authentication key recognized when the visitor enters and exits is the previously registered authentication key, the access management method may further include outputting an access disapproval Notification information when the authentication key recognized when the visitor enters and exits is not the previously registered authentication key.

The confirming of the access history information may include: receiving an access history information request signal of the visitor from the user terminal; and providing the access history information of the visitor including the user information to the user terminal.

The access history information may include an access time, and a type of authentication means.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 3 is a conceptual diagram illustrating an authentication key and user information stored in a storage unit of an authentication terminal;

FIG. 4 is a conceptual diagram illustrating access history information stored in a storage unit of an authentication terminal;

FIG. 8 is a conceptual diagram for describing an operation of confirming access history information of a visitor in a user terminal;

DETAILED DESCRIPTION OF THE EMBODIMENTS

Various embodiments will now be described more fully with reference to the accompanying drawings in which some embodiments are shown. The inventive concept may, however, be embodied in different forms and should not be construed as limited to the embodiments set forth herein. Embodiments of the inventive concept are described below in sufficient detail to enable those of ordinary skill in the art to embody and practice the present invention, and the scope of the inventive concept is defined in the claims and their equivalents.

Figure 1:
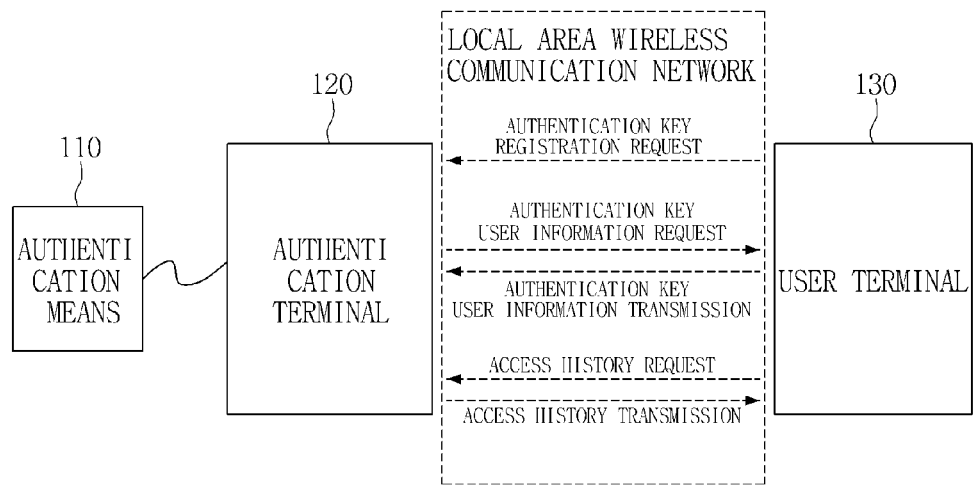
FIG. 1 is a block diagram illustrating an access management system according to an embodiment of the inventive concept.

FIG. 1 is a block diagram illustrating an access management system according to an embodiment of the inventive concept.

As shown in FIG. 1, the access management system according to an embodiment of the inventive concept may include an authentication means 110, an authentication terminal 120, and a user terminal 130.

The authentication means 110 is something having information indicating a visitor's identity. Non-limiting example embodiments of the authentication means 110 include a card, a communication terminal such as a mobile device, a part of the visitor's body such as a fingerprint or retinal pattern, but is not limited thereto.

More specifically, the authentication means 110 may include a card in which the information indicating the identity of the visitor is stored, a communication terminal in which the information indicating the identity of the visitor is stored, and a biometric authentication of the visitor, etc., but is not limited thereto. The authentication means 110 may include a separate storage means (for example, a universal serial bus (USB) device, etc.) in which the information indicating the identity of the visitor is stored. Hereinafter, for convenience of explanation, the information indicating the identity of the visitor will be referred to as an authentication key. Accordingly, it may be understood that the authentication key is the identity information of the visitor which is stored in the card, in the communication terminal, in the biometric authentication of the visitor, etc.

The authentication terminal 120 may have a construction of performing a local area wireless communication and controlling for opening and closing a door after confirming the identity of the visitor by receiving the authentication key from the authentication means 110. Hereinafter, an example of a door lock terminal controlling the opening and closing of the door is used as the authentication terminal 120 in the description, but an application field of the inventive concept is not limited thereto. For example, the inventive concept may be also applied to a safekeeping apparatus including a door locking device such as a safe in which the door locking device is installed. That is, a safe open and close history may be stored using highly identifiable user information, and after this, the safe open and close history stored as the highly identifiable user information may be confirmed.

Figure 2:
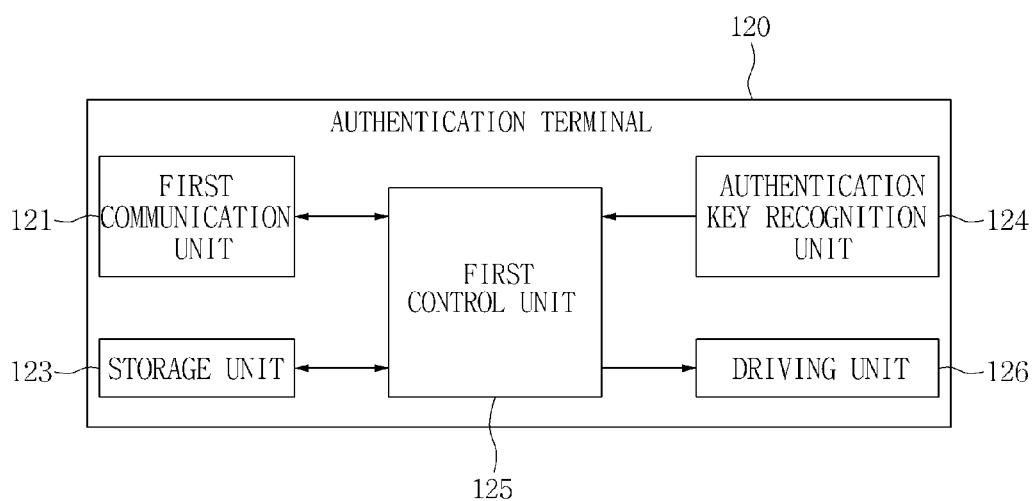
FIG. 2 is a detailed block diagram illustrating an authentication terminal according to an embodiment of the inventive concept.

FIG. 2 is a detailed block diagram illustrating the authentication terminal 120 according to an embodiment of the inventive concept.

Referring to FIG. 2, the authentication terminal 120 according to an embodiment of the inventive concept may include a first communication unit 121, a storage unit 123, an authentication key recognition unit 124, a first control unit 125, and a driving unit 126.

The first communication unit 121 may have a construction for performing local area wireless communication and include Bluetooth, near field communication (NFC), Wi-Fi, ZIGBEE, infrared-ray communication, etc., but is not limited thereto. In an embodiment of the inventive concept, the authentication terminal 120 may communicate with the user terminal 130 through the first communication unit 121.

The storage unit 123 may have a construction in which the authentication key, the user information corresponding to the authentication key, and the access history information of the visitor are stored.

For example, as shown in FIG. 3, a storage table 123a in which a plurality of authentication keys are matched with the user information corresponding to each of the plurality of authentication keys may be stored in the storage unit 123. Here, for example, the user information may include a name, a nickname, a telephone number, an address, etc., but is not limited thereto, and all information with a high discrimination may be available.

Further, as shown in FIG. 4, a history table 123b in which a type of the authentication means 110, the user information corresponding to the authentication key, and an access time are matched may be stored in the storage unit 123. Here, the type of the authentication means 110, as described above, may include the card, the communication terminal, the biometric authentication, etc.

The authentication key recognition unit 124 may have a construction for recognizing the authentication key. For example, when the authentication means 110 is the card, the authentication key recognition unit 124 may be a card reader, and when the authentication means 110 is the biometric authentication, the authentication key recognition unit 124 may be a biometric recognition means such as a fingerprint reader or a retinal scanner. Other examples of the authentication key recognition unit 124 include a NFC sensor, an facial recognition device, or the like.

Meanwhile, when the authentication means 110 is the communication terminal, the authentication key may be provided to the authentication terminal 120 through the first communication unit 121 without using the authentication key recognition unit 124.

The driving unit 126 may have a construction for driving a locking device for opening and closing the door.

The first control unit 125 may have a construction for controlling operations of the components which are organically connected as described above, i.e., a processor core having one or more hardware processors, an application-specific integrated circuit (ASIC), a field programmable gate array (FGPA), or the like. The first control unit 125 may control the components described above, that is, the first communication unit 121, the authentication key recognition unit 124, the storage unit 123, and the driving unit 126, and perform the operations of authentication key registration, authentication key confirmation, opening and closing the door, and access history storage and provision, etc.

For example, when the authentication means 110 is the card and the biometric authentication, etc., the first control unit 125 may recognize the authentication key from the authentication means 110 through the authentication key recognition unit 124, and register the recognized authentication key in the storage table 123a of the storage unit 123. Further, the first control unit 125 may transmit a signal requesting the user information corresponding to the authentication key recognized from the authentication means 110 to the user terminal 130 through the first communication unit 121, and register by matching the user information with the authentication key in the storage table 123a of the storage unit 123 after receiving the user information corresponding to the authentication key from the user terminal 130.

Meanwhile, when the authentication means 110 is the communication terminal, the first control unit 125 may recognize the authentication key provided from the communication terminal through the first communication unit 121. At this time, the first control unit 125 may receive both the authentication key and the user information corresponding to the authentication key from the communication terminal, and register the received authentication key and the received user information in the storage unit 123. Further, the first control unit 125 may receive only the authentication key from the communication terminal, receive the user information after requesting the user information corresponding to the authentication key to the user terminal 130, and register the received authentication key and the received user information in the storage unit 123.

At this time, the first control unit 125 may determine whether the authentication key recognized through the authentication key recognition unit 124 or the first communication unit 121 is an authentication key which is previously registered in the storage table 123a of the storage unit 123, and when the authentication key is the previously registered authentication key, transmit an alarm message indicating the previously registered authentication key to the user terminal 130.

Further, the first control unit 125 may determine whether the authentication key recognized when the visitor enters and exits is registered in the storage table 123a of the storage unit 123, and when the authentication key is the registered authentication key, output access approval alarm information, and at the same time, transmit a signal to the driving unit 126, and release the locking device. At this time, the first control unit 125 may store the type of the recognized authentication means 110, the user information corresponding to the authentication key, and the access time information in the history table 123b of the storage unit 123. Meanwhile, when the authentication key is not the registered authentication key, the first control unit 125 may output access disapproval alarm information.

Further, when a signal requesting the access history information of the visitor is received from the user terminal 130, the first control unit 125 may provide the access history information of the visitor stored in the history table 123b of the storage unit 123 to the user terminal 130 through the first communication unit 121.

Figure 5:
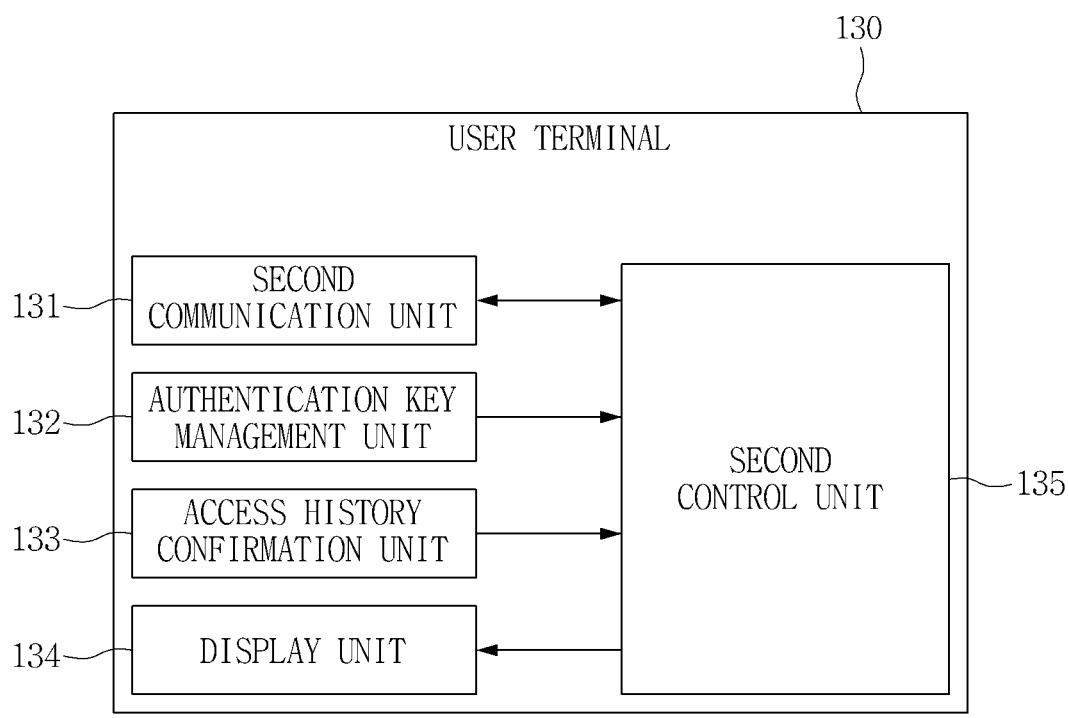
FIG. 5 is a detailed block diagram illustrating a construction of a user terminal according to an embodiment of the inventive concept.

FIG. 5 is a detailed block diagram illustrating a construction of the user terminal 130 according to an embodiment of the inventive concept.

Referring to FIG. 5, the user terminal 130 may include a second communication unit 131, an authentication key management unit 132, an access history confirmation unit 133, a display unit 134, and a second control unit 135. In an embodiment of the inventive concept, the user terminal 130 may be understood as a manager terminal registered in the authentication terminal 120, and may be one manager terminal of several manager terminals. Further, the user terminal 130 may be a general communication terminal.

The second communication unit 131 may have a construction for performing local area wireless communication, and include Bluetooth, NFC, Wi-Fi, ZIGBEE, infrared-ray communication, etc., but is not limited thereto. In an embodiment of the inventive concept, the user terminal 130 may communicate with the authentication terminal 120 through the second communication unit 131.

The authentication key management unit 132 may have a construction for registering the authentication key in the authentication terminal 120, deleting the authentication key, or changing the user information corresponding to the authentication key. That is, the user terminal 130 may register a new authentication key in the authentication terminal 120 using the authentication key management unit 132, delete an authentication key which is previously registered in the authentication terminal 120, and change the user information corresponding to the previously registered authentication key in the authentication terminal 120.

At this time, an operation of registering the new authentication key may include requesting registration of the new authentication key, and inputting the user information corresponding to the new authentication key. For example, when a user requests the registration of the new authentication key to the authentication terminal 120 using the authentication key management unit 132, the authentication terminal 120 may register by recognizing a registration target authentication key through the first communication unit 121 or the authentication key recognition unit 124, and request the user information corresponding to the registered authentication key to the user terminal 130. The user terminal 130 may transmit the user information corresponding to the registered authentication key to the authentication terminal 120 through the second communication unit 131, and the authentication terminal 120 may store in the storage table 123a of the storage unit 123 by matching the user information transmitted from the user terminal 130 with a corresponding authentication key.

Through the operation described above, the authentication key and the user information corresponding to the authentication key may be registered in the authentication terminal 120. Here, the user information, as described above, may include the name, the nickname, the telephone number, the address, etc. At this time, in an embodiment of the inventive concept, since the user terminal 130 uses the communication terminal in which a contact list is stored, when the telephone number is input as the user information, the user information may be registered in the authentication terminal 120 as a name having the same telephone number in the contact list stored in the user terminal 130.

The access history confirmation unit 133 may have a construction for confirming the access history information of the visitor. That is, when the user requests the access history information of the visitor to the authentication terminal 120 using the access history confirmation unit 133, the authentication terminal 120 may transmit the access history information of the visitor stored in the history table 123b of the storage unit 123 to the user terminal 130 through the first communication unit 121, and the user terminal 130 may receive the access history information transmitted from the authentication terminal 120 through the second communication unit 131 and display the received access history information. At this time, the access history information of the visitor, as described above, may include the type of the authentication means 110, the user information corresponding to the authentication key, and the access time. Further, when the user information is registered as the telephone number, a name having the same telephone number in the contact list stored in the user terminal 130 may be displayed.

The display unit 134 may have a construction for displaying so that the user sees an operation of the authentication key registration and the access history of the visitor, etc.

The second control unit 135 may have a construction for controlling operations of the components which are organically connected as described above. That is, the second control unit 135 may register a new authentication key in the authentication terminal 120, delete a previously registered authentication key, change the user information corresponding to the previously registered authentication key, and perform an operation of confirming the access history information, using the components described above, that is, the second communication unit 131, the authentication key management unit 132, the access history confirmation unit 133, and the display unit 134.

As described above, the access management system according to an embodiment of the inventive concept can be simply provided with the access history information of the visitor from the authentication terminal 120 using the local area wireless communication without constructing a separate server by directly storing the authentication key of the authentication means 110, the user information corresponding to the authentication key, and the access history information of the visitor in the authentication terminal 120. Accordingly, the access management system according to an embodiment of the inventive concept can reduce a cost since the separate server is not required, and prevent inconvenience of receiving through the server.

With reference to FIGS. 6A to 8, examples of operations of registering and deleting the authentication key, and an operation of confirming the access history will be described. This is only one embodiment, and the inventive concept is not limited thereto. Further, FIGS. 6A to 6D illustrate an example that the authentication means is the card, but the inventive concept is not limited thereto and it may be apparent that the inventive concept can be implemented by a method corresponding to each of various authentication means.

Figure 6A:
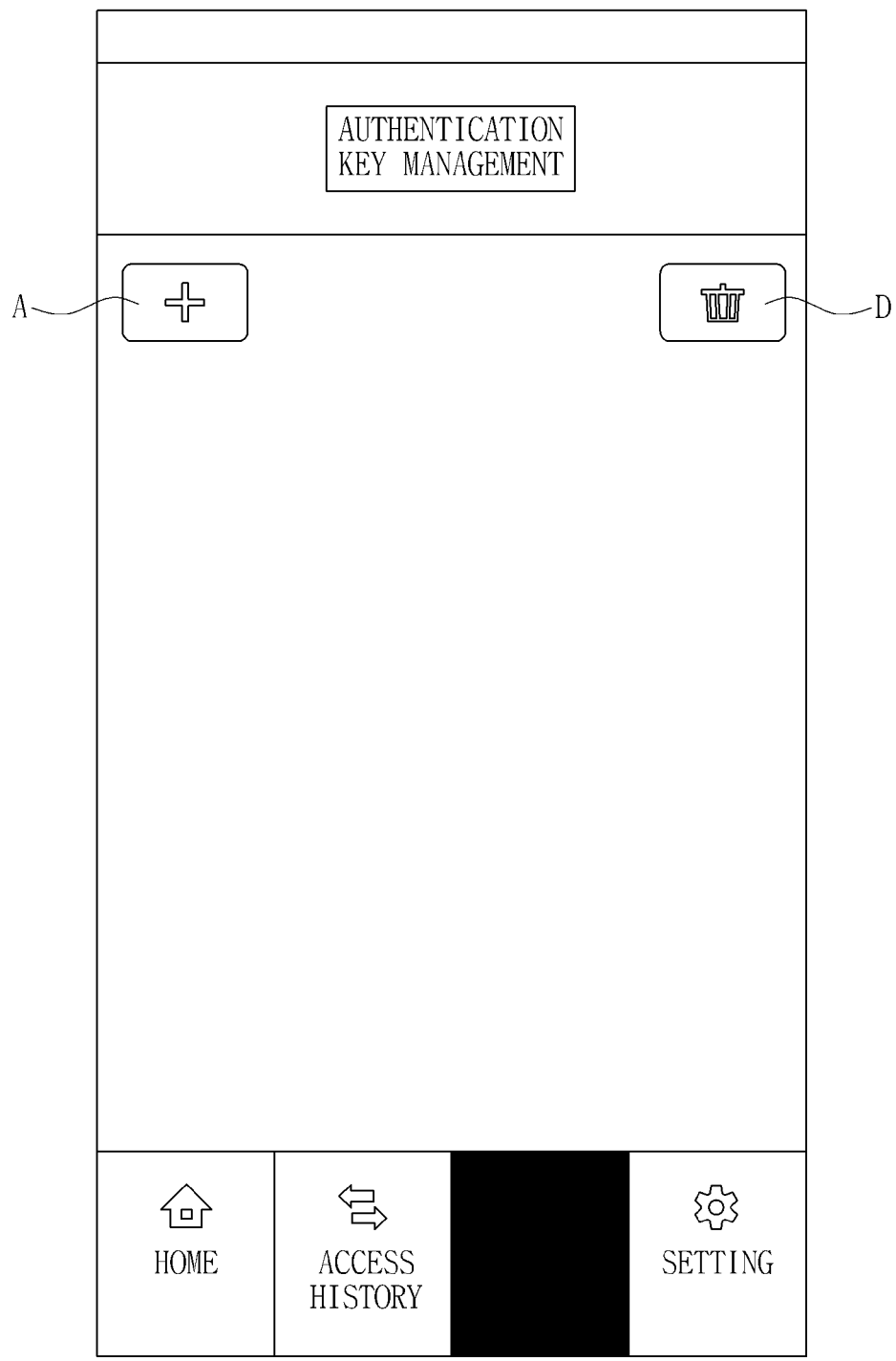
FIGS. 6A to 6D are conceptual diagrams for describing an operation of registering an authentication key and user information in an authentication terminal.

First, in a state in which an access management application for managing an access is installed in the user terminal 130 by a user, when an authentication key management menu located at the bottom is selected after the application is executed, an authentication key management page may be displayed as shown in FIG. 6A. At this time, an authentication key registration button A for requesting new authentication key registration and an authentication key deletion button D for deleting a previously registered authentication key may be displayed at the top of the authentication key management page.

Figure 6B:
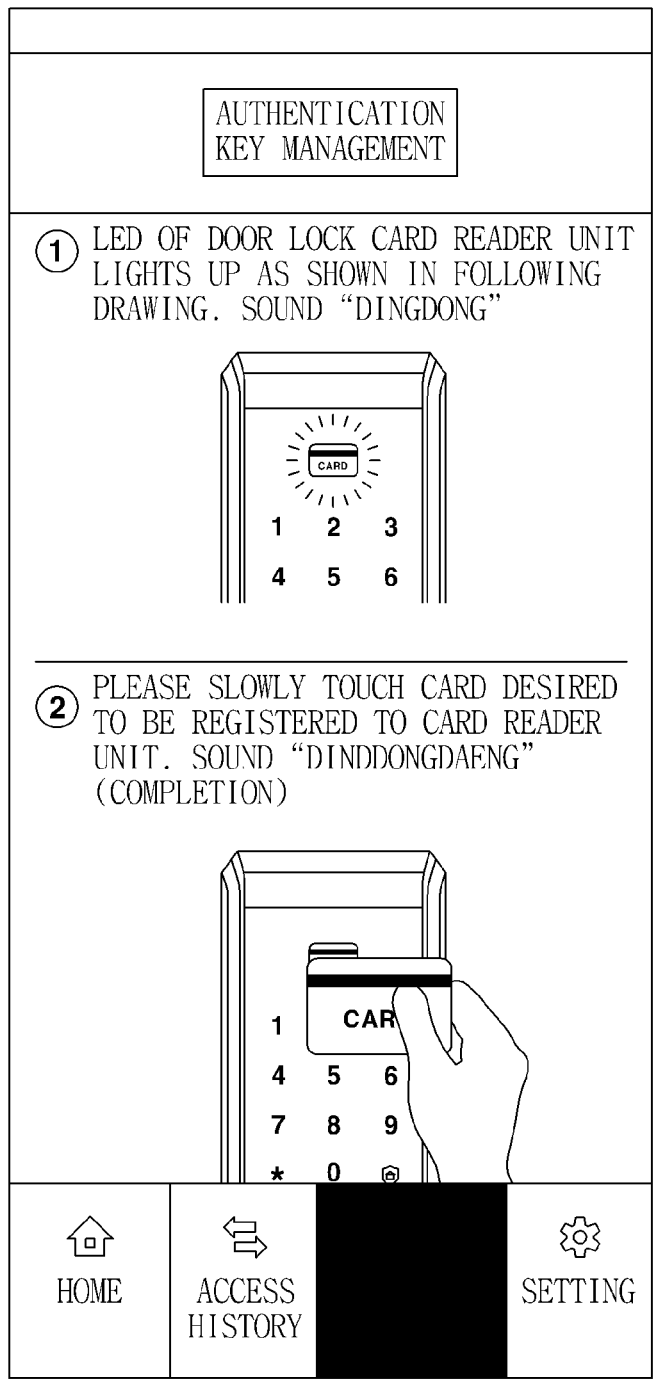

After this, when the authentication key registration button A is selected by the user and an authentication key registration request signal is transmitted to the authentication terminal 120, as shown in FIG. 6B, a message requesting the user to touch a card which is the authentication means 110 to a card reader which is the authentication key recognition unit 124 may be displayed on the display unit 134 of the user terminal 130.

Figure 6C:
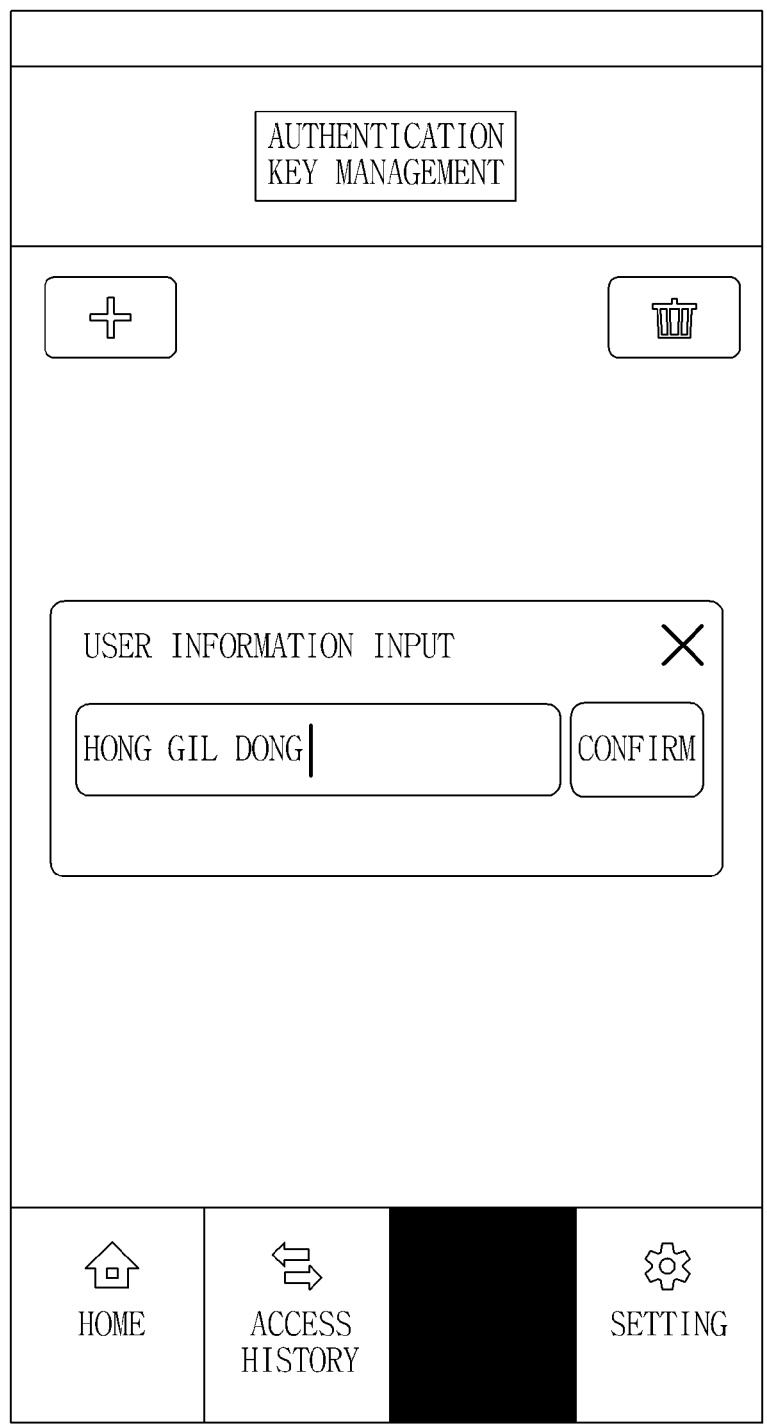

After this, when the user touches the authentication means 110 to the authentication key recognition unit 124 of the authentication terminal 120, the authentication terminal 120 may recognize the authentication key, and request user information corresponding to the authentication key to the user terminal 130 after the recognized authentication key is registered in the storage unit 123. Accordingly, a popup window for inputting the user information may be displayed on the user terminal 130, as shown in FIG. 6C.

Figure 6D:
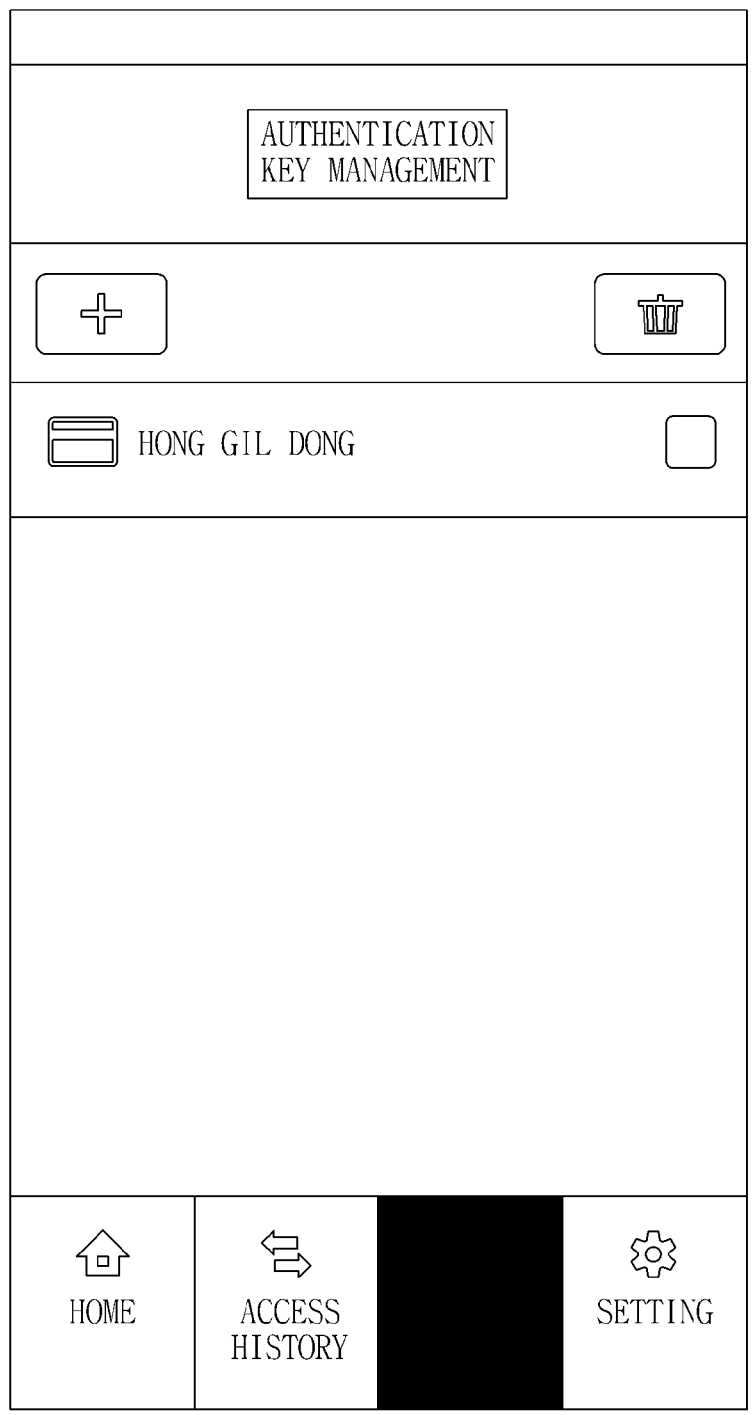

Next, when pressing a confirmation button after the user inputs the user information which is desired to be registered in the popup window for inputting user information, the user information may be transmitted to the authentication terminal 120, and the authentication terminal 120 may register in the storage unit 123 by matching the transmitted user information with a corresponding authentication key. When the registration is completed, as shown in FIG. 6D, an authentication key list registered in the authentication terminal 120 may be displayed on the user terminal 130.

Figure 7:
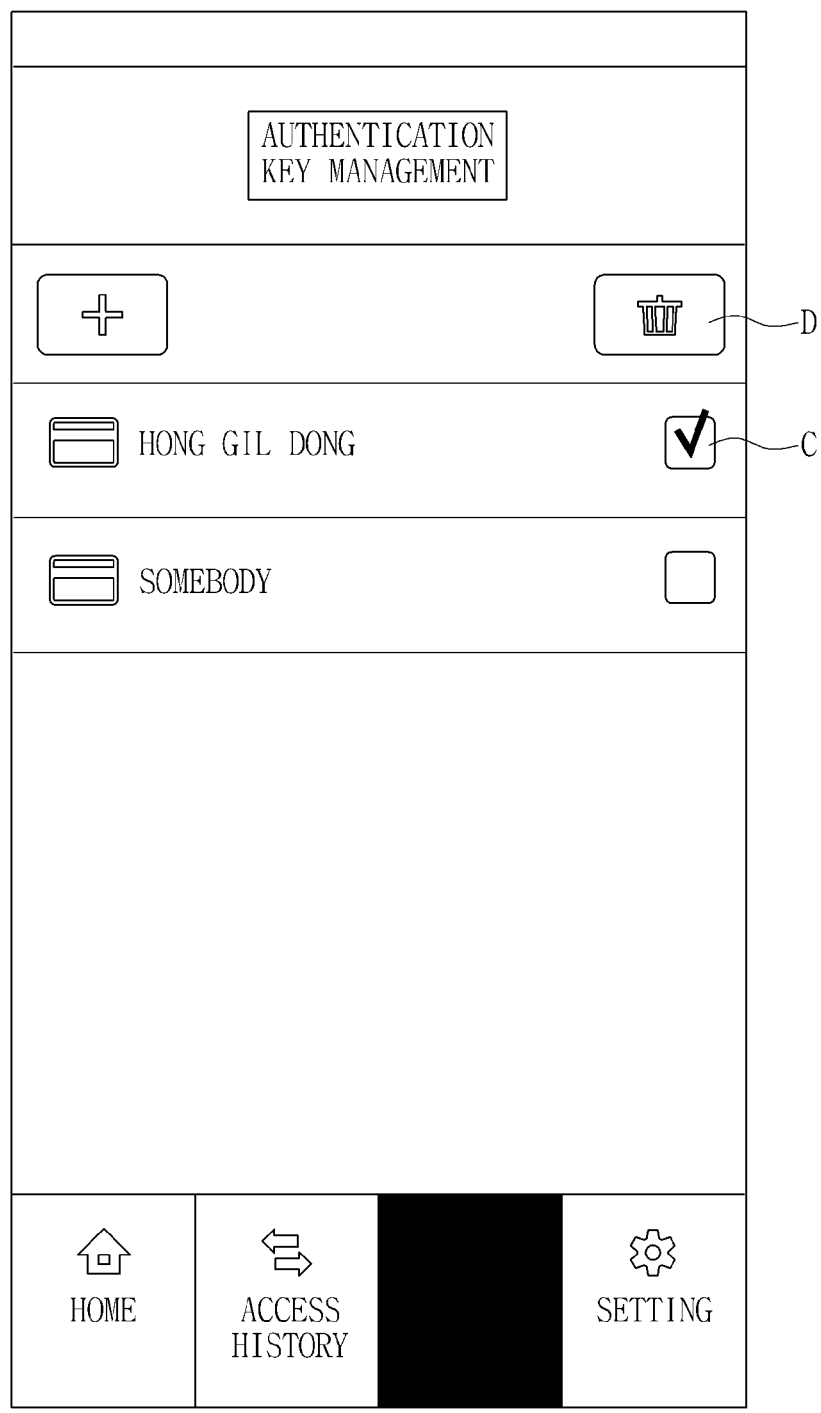
FIG. 7 is a conceptual diagram for describing an operation of deleting an authentication key registered in an authentication terminal.

Further, when the user wants to delete the authentication key which is previously registered in the authentication terminal 120, as shown in FIG. 7, the user may check a check box C of an authentication key to be deleted among the previously registered authentication keys in the authentication key management page, and delete the authentication key registered in authentication terminal 120 by selecting the authentication key deletion button D.

Meanwhile, although not shown, a method of changing the user information corresponding to the authentication key which is previously registered in the authentication terminal 120 may be performed using a method of displaying a popup window for inputting new user information.

Further, when an access history menu located at the bottom is selected by the user and an access history information request signal is transmitted to the authentication terminal 120, the authentication terminal 120 receiving the access history information request signal may transmit the access history information stored in the storage unit 123 which is the access history database (DB) to the user terminal 130, and the user terminal 130 may display the received access history information on the display unit 134.

Accordingly, since the access management system according to an embodiment of the inventive concept directly registers the authentication key, the user information corresponding to the authentication key, and the access history information in the authentication terminal 120, a separate server is not required, and thus costs can be reduced.

Further, when registering the authentication key in the authentication terminal 120, since the access management system according to an embodiment of the inventive concept may register by inputting highly identifiable authentication information, for example, the name, the nickname, the telephone number, and the address, etc., the user can intuitively confirm when reading the access history of the visitor.

Figure 9:
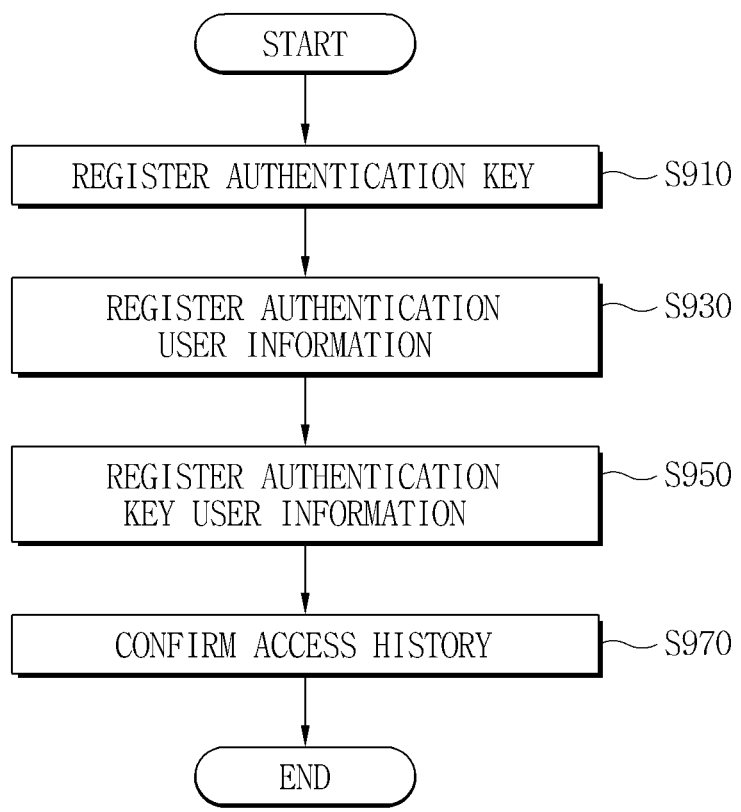
FIG. 9 is a flowchart for describing an access management method according to an embodiment of the inventive concept.

FIG. 9 is a flowchart for describing an access management method or algorithm according to an embodiment of the inventive concept.

Referring to FIG. 9, the access management method according to an embodiment of the inventive concept may largely include registering an authentication key in the authentication terminal 120 (S910), registering user information corresponding to the authentication key (S930), opening and closing a door by confirming an authentication key provided by a visitor (S950), and confirming an access history of the visitor (S970).

Figure 10:
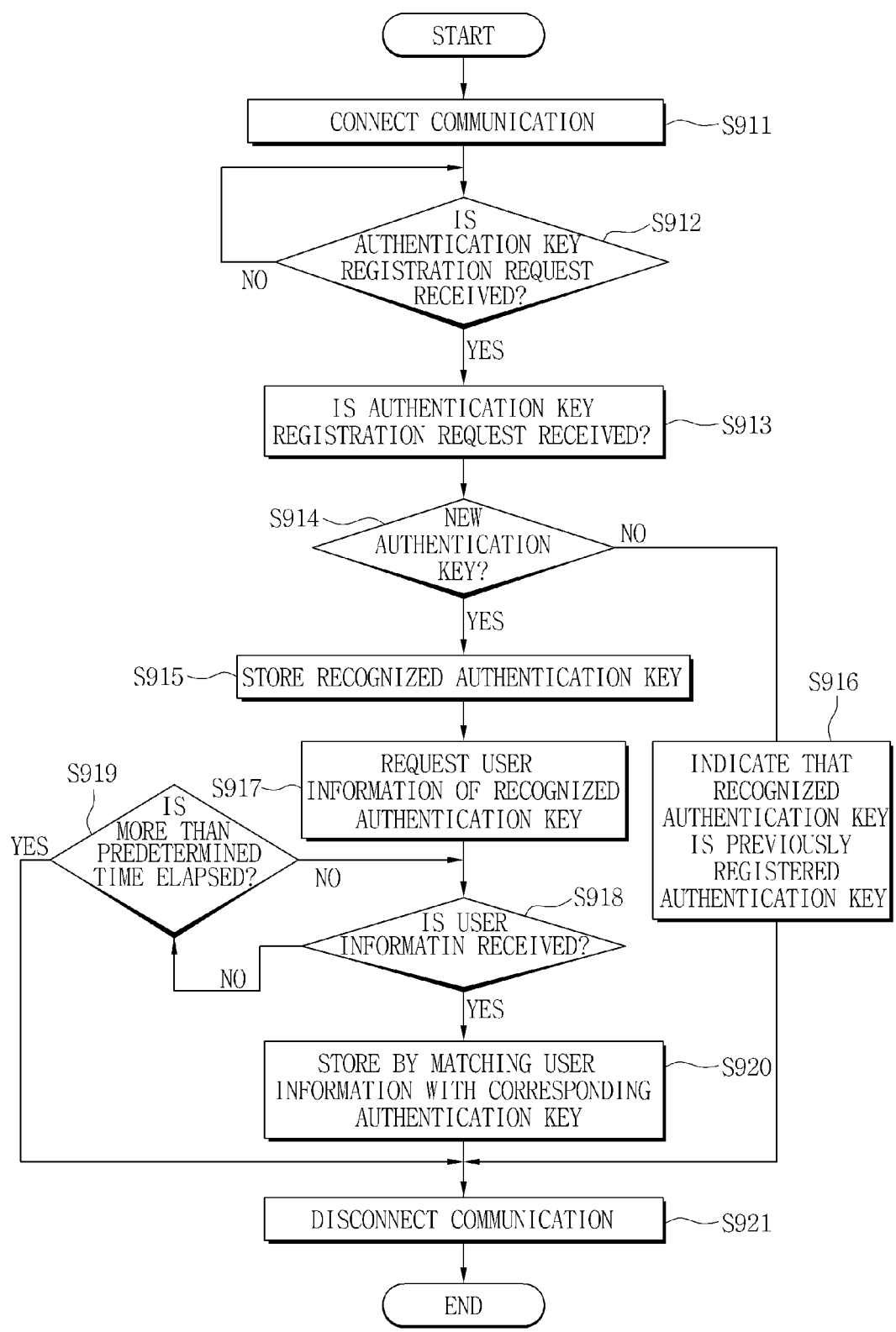
FIG. 10 is a detailed flowchart for describing an operation of registering an authentication key and user information in an authentication terminal.

First of all, the registering of the authentication key in the authentication terminal 120 (S910) and the registering of the user information corresponding to the authentication key (S930) will be described in detail with reference to the algorithm depicted in FIG. 10.

Communication between the authentication terminal 120 and the user terminal 130 may be connected (S911). At this time, the communication may be implemented to be automatically connected when the user terminal 130 is close to the authentication terminal 120, or may be implemented to be connected when the access management application is executed.

Next, the first control unit 125 of the authentication terminal 120 may determine whether an authentication key registration request signal is received from the user terminal 130 (S912), and when the authentication key registration request signal is received, recognize a registration target authentication key using the authentication key recognition unit 124 (S913).

Next, the first control unit 125 may compare the registration target authentication key recognized through the authentication key recognition unit 124 and the authentication key which is previously registered in the storage table 123a of the storage unit 123, and determine whether the recognized authentication key is a new authentication key (S914), and when the recognized authentication key is the new authentication key, register the recognized authentication key in the storage table 123a of the storage unit 123. On the other hand, when the recognized authentication key is the previously registered authentication key, the first control unit 125 may transmit a message indicating that the recognized authentication key is the previously registered authentication key (S916).

Next, the first control unit 125 may request the user information corresponding to the registration target authentication key to the user terminal 130 (S917). After this, the first control unit 125 may determine whether the user information corresponding to the registration target authentication key is received from the user terminal 130 (S918), and when the user information is received, register in the storage table 123a of the storage unit 123 by matching the received user information with the registration target authentication key (S920), and end the communication connection with user terminal 130 (S921). At this time, a method of ending the communication connection may be implemented to be automatically ended when the user terminal 130 is more than a predetermined distance away from the authentication terminal 120, or to be ended when the user terminal 130 receives an access management application end signal.

Meanwhile, when the user information corresponding to the registration target authentication key is not received from the user terminal 130, the first control unit 125 may determine whether more than a predetermined time has elapsed after requesting the user information to the user terminal 130 (S919), and when more than the predetermined time has elapsed, end the communication connection with the user terminal 130 (S921).

Figure 11:
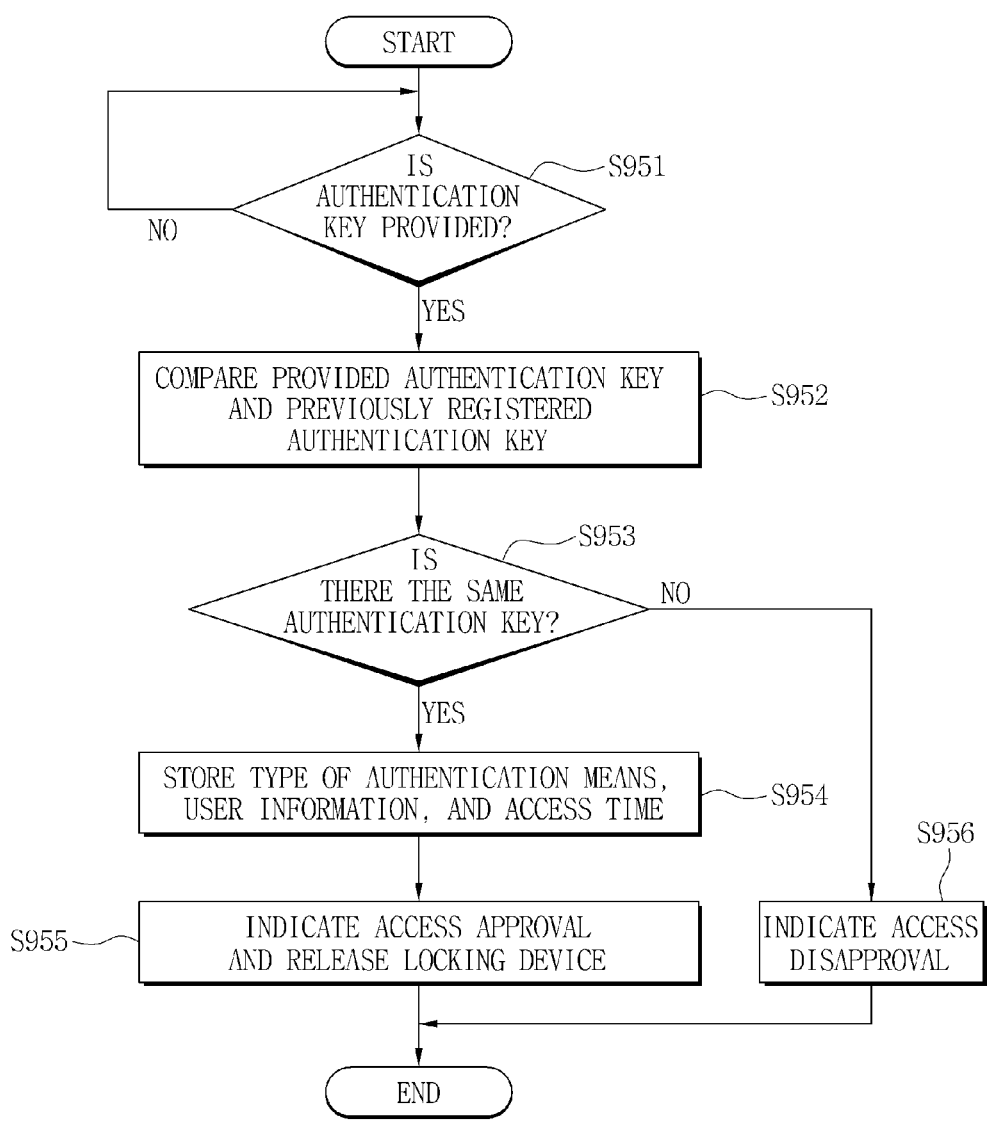
FIG. 11 is a detailed flowchart for describing an operation of confirming an authentication key and opening and closing a door in an authentication terminal.

Next, the opening and closing of the door by confirming the authentication key provided by the visitor (S950) in the authentication terminal 120 will be described in detail with reference to the algorithm depicted in FIG. 11.

First, the first control unit 125 of the authentication terminal 120 may determine whether the authentication key is recognized (S951), and when the authentication key is recognized, compare the recognized authentication key and the authentication key which is previously registered in the storage table 123a of the storage unit 123 (S952).

Next, the first control unit 125 may determine whether there is the same authentication key as the recognized authentication key in the storage table 123a (S953), and when there is the same authentication key as the recognized authentication key in the storage table 123a, store the type of authentication means, the user information, and the access time information in the history table 123b (S954), and release a locking device of the door by applying a signal to the driving unit 126 and simultaneously outputting access approval alarm information (S955). On the other hand, when there is no same authentication key as the recognized authentication key in the storage table 123a, the first control unit 125 may output access disapproval alarm information (S956).

Figure 12:
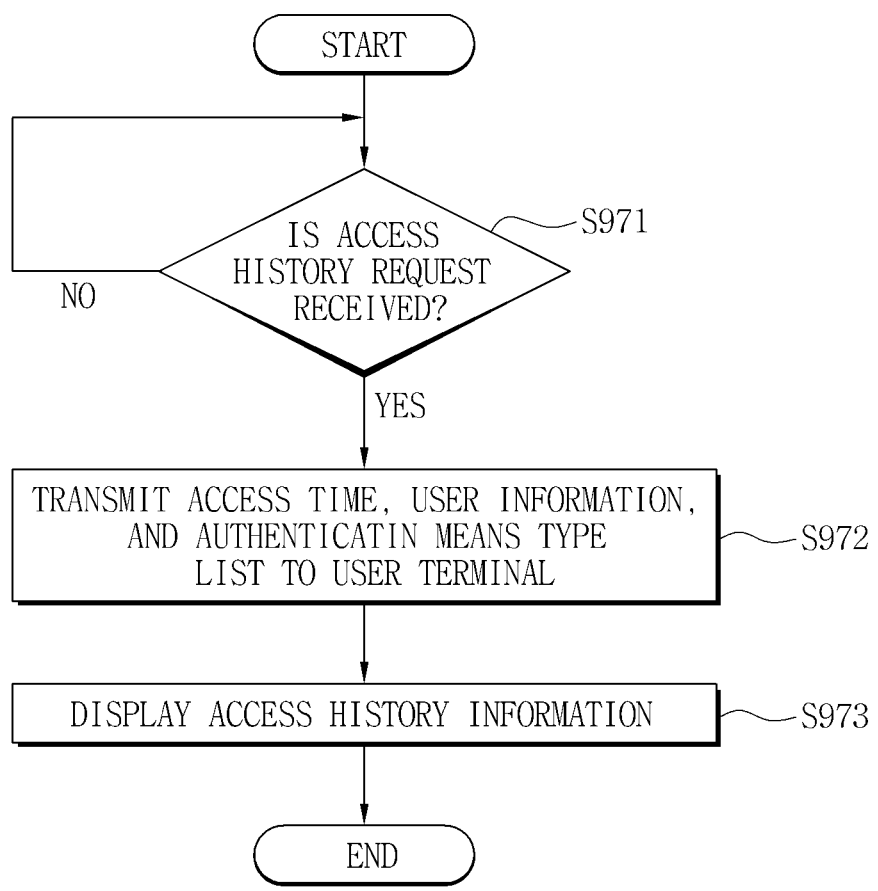
FIG. 12 is a flowchart for describing an operation of confirming access history information of a visitor.

The confirming of the access history information of the visitor in the user terminal 130 (S970) will be described in detail with reference to the algorithm depicted in FIG. 12.

First, the first control unit 125 of the authentication terminal 120 may determine whether an access history information request signal is received from the user terminal 130 (S971), and when the access history information request signal is received, transmit the access history information of the visitor including the access time, the user information, and the type of authentication means stored in the history table 123b of the storage unit 123 to the user terminal 130 through the first communication unit 121 (S972). The second control unit 135 of the user terminal 130 may receive the access history information of the visitor transmitted from the authentication terminal 120 through the second communication unit 131, and display the received access history information (S973).

According to an embodiment of the inventive concept, because of directly registering the authentication key in the authentication terminal and storing the access history information of the visitor, a separate server is not required, and thus costs can be reduced.

Further, according to an embodiment of the inventive concept, because of registering by matching the highly identifiable user information with the authentication key regardless of the type of authentication means and storing the highly identifiable user information as the access history information, the user can intuitively confirm the access history of the visitor, and directly receive the access history information of the visitor from the authentication terminal.

Since the access management system according to an embodiment of the inventive concept may directly register the authentication key, the user information corresponding to the authentication key, and the access history information in the authentication terminal, a separate server is not required. The inventive concept may be applied to a door lock terminal opening and closing a door and also applied to a safekeeping apparatus including a door locking device such as a safe in which the door locking device is installed, since the user can intuitively confirm when reading the access history of the visitor.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. An access management system, comprising:
   an authentication means having an authentication key indicating an identity of a visitor;
   an authentication terminal having a first hardware processor configured to perform a registration operation by receiving user information corresponding to the authentication key, and storing the user information matched with the authentication key recognized, when the visitor makes an access attempt, as an access history record of the visitor; and
   a user terminal having a second hardware processor configured to provide to the authentication terminal the user information corresponding to the authentication key.

2. The access management system according to claim 1, wherein the authentication terminal further comprises:
   a first communication unit configured to perform local area wireless communication with the user terminal;
   an authentication key recognition unit configured to recognize the authentication key;
   a storage configured to store the authentication key, the user information corresponding to the authentication key, and the access history record of the visitor; and
   a first control unit implemented by the first hardware processor and configured to recognize a registration target authentication key using the authentication key recognition unit in response to receiving an authentication key registration request signal from the user terminal through the first communication unit, to request the user information corresponding to the recognized registration target authentication key from the user terminal, to perform a registration in the storage by matching the user information provided from the user terminal with the registration target authentication key, and to store the user information corresponding to the authentication key provided by the visitor as the access history record of the visitor when the visitor enters or exits.

3. The access management system according to claim 2, wherein the first control unit determines whether the authentication key recognized when the visitor enters or exits is registered in the storage unit, and when the recognized authentication key is registered in the storage unit, releases a physical locking device, and stores in the storage the user information corresponding to the recognized authentication key as the access history record of the visitor.

4. The access management system according to claim 2, wherein the first control unit transmits the access history record of the visitor to the user terminal through the first communication unit in response to a signal requesting the access history record.

5. The access management system according to claim 1, wherein the user terminal further comprises:
a second communication unit configured to perform local area wireless communication with the authentication terminal;
an authentication key management unit configured to request an authentication key registration to door lock terminal, and provide the user information corresponding to the authentication key;
an access history confirmation unit configured to confirm the access history information of the visitor; and
a second control unit implemented by the second hardware processor and configured to send a request for the authentication key registration to the authentication terminal using the authentication key management unit, to provide the user information corresponding to the authentication key to the authentication terminal, and to display the access history records of the visitor received from the authentication terminal.

6. The access management system according to claim 5, wherein the second control unit is further configured to delete a previously registered authentication key.

7. The access management system according to claim 5, wherein the second control unit is further configured to implement a change to previously registered user information corresponding to the authentication key.

8. The access management system according to claim 1, wherein the user information comprises at least one of: a name, a nickname, a telephone number, and an address.

9. The access management system according to claim 1, wherein the access history record of the visitor further comprises an access time, and a type of the authentication means.

10. The access management system according to claim 1, wherein the authentication means comprises at least one of: a card, a communication terminal, and biometric authentication.

11. An access management method, comprising:
registering an authentication key indicating an identity of a visitor in an authentication terminal;
receiving and registering user information, from a user terminal, corresponding to the authentication key;
determining when the visitor enters or exist by receiving and recognizing an authentication key of the visitor;
storing the user information corresponding to the authentication key recognized when the visitor enters or exits as an access history record; and
confirming the access history information.

12. The access management method according to claim 11, wherein the registering of the authentication key comprises:
receiving an authentication key registration request signal from the user terminal;
recognizing the authentication key;
determining whether the recognized authentication key is a new authentication key;
when the recognized authentication key is the new authentication key, registering the recognized authentication key; and
when the recognized authentication key is the previously registered authentication key, transmitting to the user terminal a message indicating that the recognized authentication key is a previously registered authentication key.

13. The access management method according to claim 12, further comprising, before the receiving of the authentication key registration request signal from the user terminal, implementing a communication connection between the authentication terminal and the user terminal.

14. The access management method according to claim 11, wherein the receiving and registering, of the user information corresponding to the authentication key, comprises:
requesting from the user terminal the user information corresponding to the authentication key;
determining whether the user information corresponding to the authentication key is received from the user terminal; and
when the user information corresponding to the authentication key is received, performing a registration operation by matching the user information with a corresponding authentication key.

15. The access management method according to claim 14, further comprising, after the registering by matching the user information with the corresponding authentication key, ending the communication connection between the authentication terminal and the user terminal.

16. The access management method according to claim 11, wherein the storing, of the user information corresponding to the authentication key recognized when the visitor enters or exits, as the access history record, comprises:
determining whether the authentication key recognized when the visitor enters or exits is a previously registered authentication key; and
when the authentication key recognized when the visitor enters or exits is the previously registered authentication key, releasing a physical locking device of a door and storing the user information corresponding to the authentication key as the access history record.

17. The access management method according to claim 16, further comprising, after the determining of whether the authentication key recognized when the visitor enters or exits is the previously registered authentication key, outputting an access disapproval notification information when the authentication key recognized when the visitor enters or exits is not the previously registered authentication key.

18. The access management method according to claim 11, wherein the confirming of the access history information comprises:
receiving from the user terminal an access history record request signal of the visitor; and
providing the access history record of the visitor, including the user information, to the user terminal.

19. The access management method according to claim 18, wherein the access history record comprises an access time and a type of authentication means.

20. An access management system, comprising:
a user terminal, having:
a respective processor, and a respective memory,
the respective memory of the user terminal storing computer program instructions enabling the respective processor of the user terminal to receive an authentication key and user information, corresponding to an authorized user, as authorized user authentication information; and
an authentication terminal, having:
a respective processor, and a respective memory, and
the respective memory of the authentication terminal storing computer program instructions enabling the respective processor of the authentication terminal to implement operations, including:
- receiving the authorized user authentication information from the user terminal;
- storing the user authentication information in the respective memory of the authentication terminal;
- receiving, from a visitor, a visitor authentication key;
- matching the visitor authentication key to the authentication key of the authorized user authentication information to obtain a matched authentication key; and
- responding to the matching by storing in the respective memory of the authentication terminal an entry record of the user information corresponding to the matched authentication key.

21. The access management system according to claim 20, wherein the authentication terminal further comprises:
- a first communication unit configured to perform local area wireless communication with the user terminal;
- an authentication key recognition unit configured to receive the visitor authentication key; and
- a first control unit, implemented by the processor of the authentication terminal, and configured to implement operations, including:
  - recognizing a registration target authentication key using the authentication key recognition unit to obtain the authentication key corresponding to an authorized user, in response to detecting, through the first communication unit, an authentication key registration request signal from the user terminal;
  - requesting the user information corresponding to the recognized registration target authentication key to the user terminal;
  - forming the authorized user authentication information based on the user information and the authentication key corresponding to the authorized user; and
  - storing the entry record when the visitor enters and exits.

* * * * *